Dec. 15, 1925.   1,565,803
P. M. JENSEN
STEERING WHEEL FOR AUTOMOBILES AND THE LIKE
Filed June 21, 1923
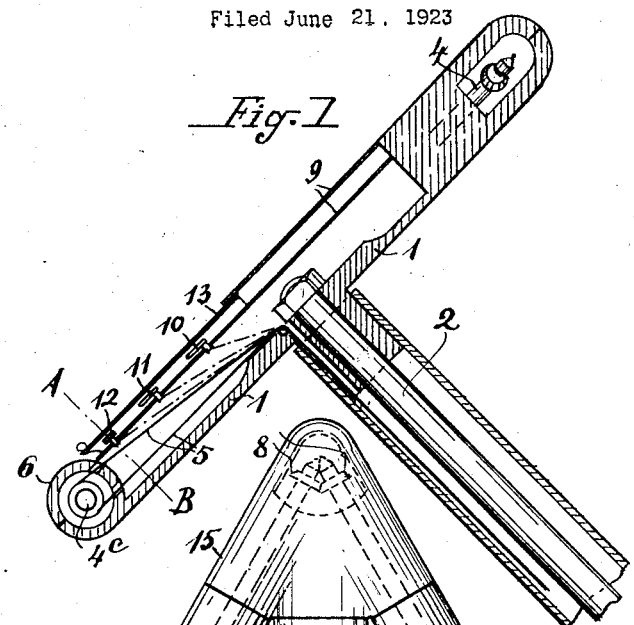
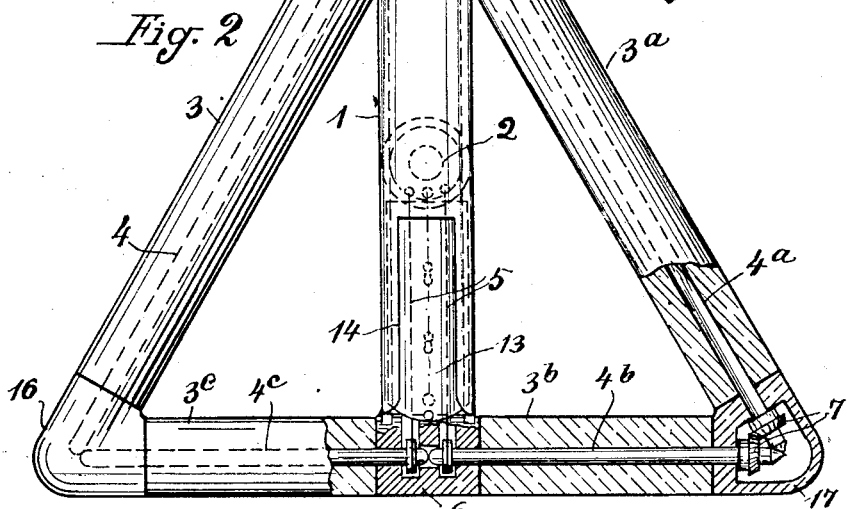
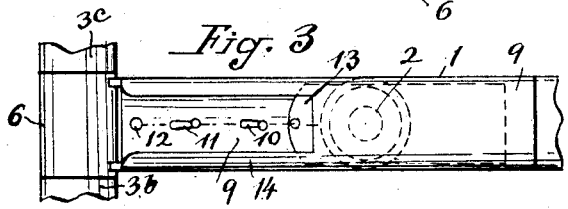
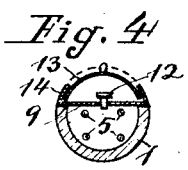
Inventor
Peter Martin Jensen
by B. Singer Atty

Patented Dec. 15, 1925.

1,565,803

UNITED STATES PATENT OFFICE.

PETER MARTIN JENSEN, OF COPENHAGEN, DENMARK.

STEERING WHEEL FOR AUTOMOBILES AND THE LIKE.

Application filed June 21, 1923. Serial No. 646,886.

*To all whom it may concern:*

Be it known that I, PETER MARTIN JENSEN, a citizen of Denmark, and residing at Copenhagen, Denmark, Kronborggade 20, have invented certain new and useful Improvements in Steering Wheels for Automobiles and the like, of which the following is a specification.

The invention relates to improvements in steering wheels for automobiles, aeroplanes, tractors, motorboats and the like, and which provides means for regulating the supply of fuel, controlling the magneto, the electric signal apparatus, and the like.

According to this invention the handles necessary for regulating the supply of fuel, controlling the magneto, and like are formed by parts of the steering wheel, the same being shaped as a three-sided polygon frame, the sides of which form handles, adapted to be turned about their longitudinal axes and by strings, chains, bars or the like are connected with the contacts, valves or the like, to be operated. Hence, the driver can, while steering, readily operate the handles and control the car.

In the accompanying drawings—

Fig. 1 is a section through the middle of the wheel and a part of the steering column.

Fig. 2 is a plan of the wheel partly in section.

Fig. 3 is a detail plan, showing the slide open.

Fig. 4 is a detail transverse sectional view.

In the form of the invention here shown, the wheel rim is triangular and by a crosspiece 1 is fixed on the steering column 2. The side members of the rim form handles 3, $3^a$, $3^b$ and $3^c$, which can be turned, together with their longitudinal shafts respectively 4, $4^a$, $4^b$, and $4^c$. From the shafts $4^b$ and $4^c$ strings or the like 5 extend to the controlling devices of the car which have to be operated. The two adjoining shaft ends rest in a bearing 6 and are connected with the cross-piece 1. This latter may be totally or partly hollow, so that the strings or the like 5, as indicated, can lie hidden in the cavity therein and in the steering column or the fixed tube surrounding the same. The wheel rim may be quadrangular, hexagonal, or polygonal, but is preferably triangular. The rim members 3, $3^a$, $3^b$ have their respective shafts 4, $4^a$, $4^b$ connected together by beveled gears 7, 8 as shown. The shaft $4^c$ of the member $3^c$ is independently mounted. Such provision of the rim members, which form handles, is advantageous in that it greatly facilitates teaching a novice to drive and enables the instructor to keep the car under his own control while instructing, and at the same time permits the novice to participate in the management of the car.

The cross-piece 1 as shown in Fig. 4 has a trough-shaped cross-section and is covered by a solid plate screen 9, in the front end of which are placed two turning contacts 10, 11 for the magneto and the lamps, and also has a contact 12 for the electric signaling apparatus. Power transmitting elements 5 lead through the steering column 2 to the controlling devices of the car.

The contacts 10, 11, 12 mounted on the member 9, are covered by a slide 13 which is movable lengthwise on the member, so that as shown in Figs. 1 and 2, it can be closed over the contacts or, as shown in Fig. 3 can be opened to afford access to the contacts while driving.

The solid pieces of the frame, namely the cross-piece 1 and the corner pieces 15, 16 and 17 are preferably of aluminium.

It will be readily understood that the invention facilitates driving and affords security against unauthorized use of the car, as the slide 13 by a suitable arrangement of locks may be securely fastened in either open or closed position.

Having described my invention, what I claim as new and desire to secure by Letters Patent is:—

1. A polygonal steering wheel comprising rim members connected together at the angles of the wheel for rotation.

2. A polygonal steering wheel comprising rim members connected together at the angles of the wheel for rotation, and means to cause said members to turn simultaneously.

3. A polygonal steering wheel comprising rim members, means at the angles of the wheel connecting said members for rotation, and a crosspiece arranged to be mounted on a steering post and supporting said rim members.

4. A polygonal steering wheel comprising rim members, means at the angles of the wheel connecting said members for rotation, and a crosspiece arranged to be mounted on a steering post and supporting said rim members, intergeared rods connecting said rim members together for simultaneous rotation, and power transmitting elements actuated by said rim members.

5. A polygonal steering wheel comprising rim members, means at the angles of the wheel connecting said members for rotation, a crosspiece arranged to be mounted on a steering post and supporting said rim members, intergeared rods connecting said rim members together for simultaneous rotation, power transmitting elements actuated by said rim members, and electric circuit closers on said crosspiece.

6. A polygonal steering wheel comprising rim members, means at the angles of the wheel connecting said members for rotation, a crosspiece arranged to be mounted on a steering post and supporting said rim members, intergeared rods connecting said rim members together for simultaneous rotation, power transmitting elements actuated by said rim members, electric circuit closers on said crosspiece, and means to couple and uncouple said circuit closers.

In witness whereof I have hereunto set my hand.

PETER MARTIN JENSEN.